Nov. 12, 1968  H. C. SHAW, JR  3,410,614

ANTIFRICTION WAY BEARING

Original Filed Oct. 11, 1965

INVENTOR:
HOWARD C. SHAW, JR.
BY
Dawson, Tilton, Fallon, Lungmus, Alexander,
ATT'YS United States Patent Office 3,410,614
Patented Nov. 12, 1968

3,410,614
ANTIFRICTION WAY BEARING
Howard C. Shaw, Jr., 103 Gale Ave.,
River Forest, Ill. 60305
Continuation of application Ser. No. 494,821, Oct. 11,
1965. This application Dec. 29, 1967, Ser. No. 694,751
5 Claims. (Cl. 308—6)

ABSTRACT OF THE DISCLOSURE

Antifriction way bearing having cylindrical, centrally annularly recessed bearing elements interconnected by a wire member having a figure-8 configuration, a rolling surface provided by the raceway equipped with transversely arcuate entries, the raceway further having an adapter arcuately contoured both transversely and longitudinally.

---

This application is a continuation of application Ser. No. 494,821, filed Oct. 11, 1965, now abandoned.

The invention finds particular utility in supporting in skewless fashion a machine tool element for easy movement on a stationary surface, especially a numerically controlled, servo-operated machine tool. In the operation of such devices, it is important that translation or the sideward component of a generally forward movement be eliminated so that the machine element does not end to move sidewardly when only forward movement is desired.

It is, therefore, an object of the invention to provide a bearing of the character indicated wherein the problem of undesirable translation is minimized, particularly through the elimination of any substantial skewing of the elements making up the recirculating bearing.

Another object of the invention is to provide an antifriction way bearing wherein the entry of the cylindrical elements into the bearing area is facilitated by a novel configuration in the way surface which aids materially in avoiding skewing of the cylindrical bearing elements.

Stil another object is to provide a recirculating bearing wherein a uniquely designed adapter is incorporated into the overall combination for advantageously stabilizing the machine tool or other supported element on the bearing race.

Other objects and advantages of the invention may be seen in the details of construction and operation set down in the following specification.

The invention is described in conjunction with an illustrative embodiment iu the accompanying drawing, in which—

Figure 1:
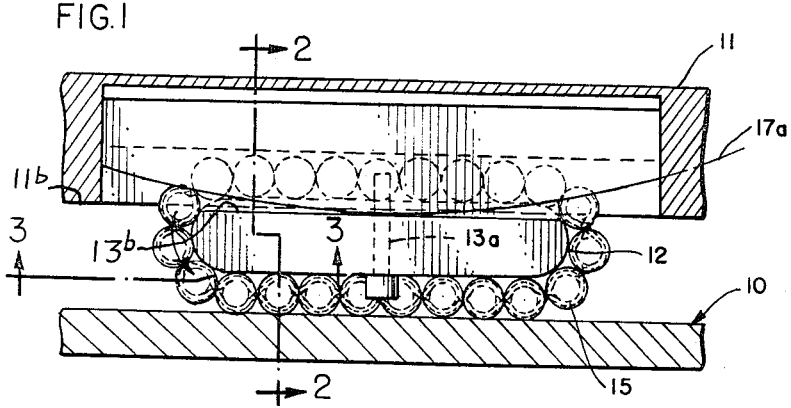
FIG. 1 is a fragmentary elevational view, partially in section, of the inventive bearing as would be seen along the view line 1—1 applied to FIG. 2.

In the illustration given and with particular reference to FIG. 1, the numeral 10 designates generally a stationary support element on which a movable member 11 such as a slide or table of a milling machine is positionably mounted. The mounting of the element 11 is achieved through the orbital type bearing generally designated 12 and which can be seen in cross section in FIG. 2.

Figure 2:
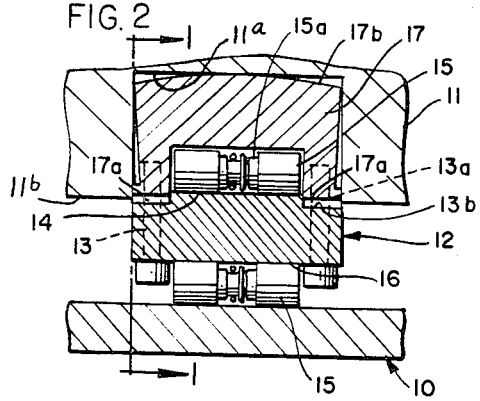
FIG. 2 is a fragmentary sectional view of the bearing such as would be seen along the sight line 2—2 applied to FIG. 1.
Figure 5:
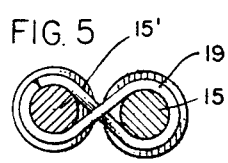
FIG. 5 is a sectional view taken along the line 5—5 of FIG. 4.
Figure 6:
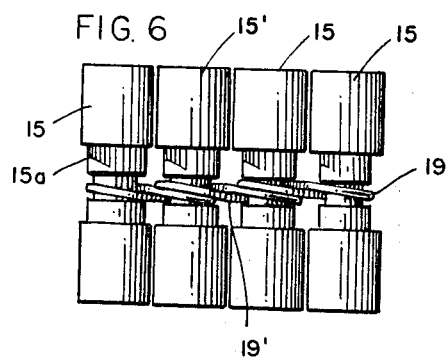
FIG. 6 is a plan view of a group of elements interconnected in the fashion indicated in the preceding views.

Referring now to FIG. 2, the numeral 13 designates the raceway or body portion of the bearing and is seen to have an upper central surface 14 providing a return track for interconnected cylindrical bearing elements 15. Each element 15 is equipped with an annular recess 15a and adjacent elements are interconnected in the fashion shown in FIGS. 4–6. The lower run of the elements occurs in a track portion or rolling surface 16 of the way 13 wherein the elements 15 support the way 13 on the support surface 10.

In the illustration given, an adapter 17 is provided in a slat 11a extending upwardly from surface 11b which is recessed to coact with the top track 14 in defining a guide for the return run of the elements 15, the body portion 13 being secured to the adapter 17 by bolts 13a (see FIG. 1) centrally longitudinally of the adapter and which connect the mounting surface 13b of the race 13 with the adapter.

In the operation of the device, when movement of the machine element 11 is called for (relative to the support surface 10), the bearing elements 15 move in an orbital path supporting the race 13 on their upper sides and bearing against the surface or way 10 on their lower sides. The weight of the member 11 is transmitted through the adapter 17 to the race 13. In the illustration given, I find it advantageous to longitudinally and transversely arch the lower and upper surfaces of the adapter as at 17a and 17b, respectively, to provide a gimbal-type action.

Figure 3:
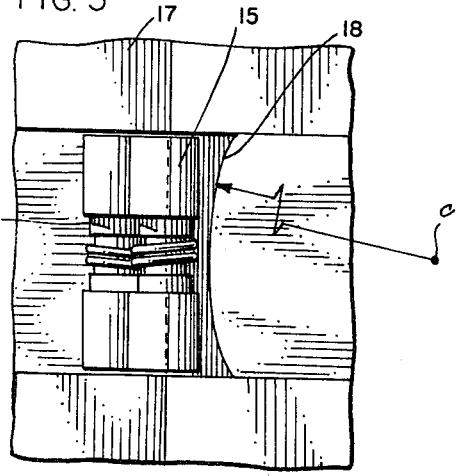
FIG. 3 is an enlarged fragmentary sectional view as seen along the sight line 3—3 applied to FIG. 1.

The elements 15 as they enter the bearing protion of the orbital travel encouter an edge-relieved surface as at 18 (see FIG. 3). The relieved surface 18 is arcuate and is provided at both ends of the roling surface 16 to accommodate to and fro movements of the machine element 11. This arcuate surface 18 is developed by arching the terminal portions of the rolling surface 16 about a longitudinally displaced center as at C in FIG. 3. This I find advantageous in eleminating any skewing of one element 14 relative to an adjacent element. It should be appreciated that for optimum operation, the axis of each bearing element 15 should be exactly perpendicular to the path of travel of the elements 15. This is achieved through the arc 18 which serves to focus, in effect, the path of the rolers or elements 15 on the center of the opposite ends of the race 13.

Figure 4:
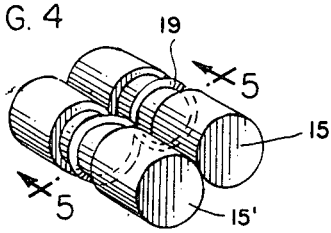
FIG. 4 is a perspective view of two of the bearing elements shown in their coupled condition.

Skewless operation is substantially achieved by interconnecting adjacent elements by means of a coupling element such as is designated 19 in FIG. 4. This may take the form of a flexible wire arranged in a loop and subsequently twisted on itself to form a figure 8 configuration (or twist link), after which the recessed portions are positioned as seen in the drawing (see the interconnected elements 15 and 15' in FIGS. 4–6, the endless chain type of connection being apparent from FIG. 6). The recesses may have a diameter of the order of 0.150", while the roller bearings 15 have a diameter of 0.200", with the wire O.D. being about 0.020".

I claim:

1. An orbital way bearing, comprising a relatively elongated raceway providing parallel rolling and mounting surfaces and an orbital path including said rolling surface for roller bearing elements, a plurality of elongated roller bearing elements in said path arranged in side-by-side relation, each element having an annular recess intermediate the ends thereof, and connective means coupling adjacent elements together in the recesses thereof, said connective means including a wire member formed into a figure-8 configuration.

2. An orbital way bearing, comprising a relatively elongated raceway providing parallel rolling and mounting surfaces and an orbital path including said rolling surface for roller bearing elements, a plurality of elongated cylindrical-surfaced roller bearing elements in said path arranged in side-by-side relation, each element having an annular recess intermediate the ends thereof, and connective means coupling adjacent elements together in the recesses thereof, said roller surface being equipped with transversely arcuate entries.

3. An orbital way bearing, comprising a relatively elongated raceway providing parallel rolling and mounting surfaces and an orbital path including said rolling surface for roller bearing eements, a plurality of elongated roller bearing elements in said path aranged in side-by-side relation, each element having an annular recess intermediate the ends thereof, and connective means coupling adjacent elements together in the recesses thereof, said raceway being equipped with an adapter on the mounting surface thereof, and said adapter having an arcuately contoured surface in confronting relation with said mounting surface, and a machine member supported on said adapter, said adapter having a second arcuately contoured face in confronting, contracting relation with said machine member, the arcuate curvature of said two surfaces being perpendicularly related.

4. An orbital way bearing, comprising a relatively elongated raceway providing parallel rolling and mounting surfaces and an orbital path including said rolling surface for roller bearing elements, a plurality of elongated cylindrical-surfaced roller bearing elements in said path arranged in side-by-side relation, each element having an annular recess intermediate the ends thereof, said roller surface being equipped with transversely arcuate entries.

5. An orbital way bearing, comprising a relatively elongated raceway providing parallel rolling and mounting surfaces and an orbital path including said rolling surface for roller bearing elements, a plurality of elongated roller bearing elements in said path arranged in side-by-side relation, said raceway being equipped with an adapter on the mounting surface thereof, said adapter having an accurately contoured surface in confronting relation with said mounting surface, and a machine member supported on said adapter, said adapter having a second arcuately countoured face in confronting, contacting relation with said machine member, the arcuate curvature of said two surfaces being perpendicularly related.

References Cited

UNITED STATES PATENTS

| | | | |
|---|---|---|---|
| 667,684 | 2/1901 | Deharde | 308—185 |
| Re.15,345 | 4/1922 | Robson | 308—217 X |
| 2,211,881 | 8/1940 | Collett | 64—23.7 |
| 2,659,637 | 11/1953 | Barr | 308—207 |
| 3,003,828 | 10/1961 | Stark | 308—6 X |
| 3,248,900 | 5/1966 | Shurts | 308—6 X |
| 3,272,569 | 9/1966 | Mergen | 308—6 |
| 3,301,611 | 1/1967 | Dunlap | 308—6 |

FOREIGN PATENTS

| | | |
|---|---|---|
| 707,621 | 7/1931 | France. |
| 964,310 | 7/1964 | Great Britain. |
| 433,767 | 4/1948 | Italy. |

MARTIN P. SCHWADRON, *Primary Examiner.*

L. L. JOHNSON, *Assistant Examiner.*